(12) United States Patent  (10) Patent No.: US 9,101,988 B1
Shannon  (45) Date of Patent: Aug. 11, 2015

(54) PIPE EXTRACTOR THAT REMOVES PIPE FROM CONNECTORS OR FITTINGS

(76) Inventor: Michael Patrick Shannon, Weed, CA (US)

( * ) Notice: Subject to any disclaimer, the term of this patent is extended or adjusted under 35 U.S.C. 154(b) by 156 days.

(21) Appl. No.: 13/602,181

(22) Filed: Sep. 2, 2012

(51) Int. Cl.
*B23B 51/00* (2006.01)

(52) U.S. Cl.
CPC ....... *B23B 51/0009* (2013.01); *Y10T 408/5583* (2015.01)

(58) Field of Classification Search
CPC .......................... B23B 51/0009; B23B 51/103
USPC ........... 408/201, 227, 229, 224, 225, 223, 79, 408/80, 81
See application file for complete search history.

(56) References Cited

U.S. PATENT DOCUMENTS

| | | | | | |
|---|---|---|---|---|---|
| 2,886,081 | A | * | 5/1959 | Cowley | 408/224 |
| 3,543,820 | A | * | 12/1970 | Tulumello | 144/219 |
| 4,043,698 | A | * | 8/1977 | Chelberg | 408/201 |
| 4,693,643 | A | * | 9/1987 | Heyworth | 408/82 |
| 4,917,550 | A | * | 4/1990 | Aurentz | 408/225 |
| 5,000,629 | A | * | 3/1991 | Nygards | 408/82 |
| 5,401,126 | A | * | 3/1995 | Norris et al. | 408/225 |
| 5,655,861 | A | * | 8/1997 | Bardeen et al. | 408/227 |
| 5,697,738 | A | * | 12/1997 | Stone et al. | 408/225 |
| 5,947,655 | A | * | 9/1999 | Ramsey | 408/80 |
| 6,206,618 | B1 | * | 3/2001 | Ramsey | 408/80 |
| 6,253,812 | B1 | * | 7/2001 | Rinehart | 142/56 |
| 6,698,321 | B2 | * | 3/2004 | Oswald | 82/113 |
| 6,929,430 | B2 | * | 8/2005 | Dever | 408/80 |
| 7,264,427 | B1 | * | 9/2007 | Kunz-Mujica | 408/202 |
| 7,473,056 | B2 | * | 1/2009 | Durfee | 408/225 |
| 7,513,719 | B2 | * | 4/2009 | Keiper | 408/82 |
| 2008/0304927 | A1 | * | 12/2008 | Dost | 408/228 |
| 2009/0136306 | A1 | * | 5/2009 | Howard et al. | 408/1 R |
| 2010/0247259 | A1 | * | 9/2010 | Davidian et al. | 408/228 |

FOREIGN PATENT DOCUMENTS

GB  2359774 A  *  9/2001

\* cited by examiner

*Primary Examiner* — Daniel Howell
*Assistant Examiner* — Nicole N Ramos
(74) *Attorney, Agent, or Firm* — Plager Schack LLP

(57) ABSTRACT

A pipe extractor removes a broken pipe from a connector or a fitting. The pipe extractor comprises an upper shaft mechanically coupled to a lower shaft where the lower shaft is further mechanically coupled to cutting insert, the cutting insert comprises a stop, a shaving edge and a cutting edge. A user can affix the upper shaft to a drill and engage the drill to turn the cutting insert causing the cutting edge to remove the broken pipe from the connector or the fitting. The cutting insert is further affixed to a guide such that the guide can ensure that the cutting edge is properly aligned with the broken pipe.

3 Claims, 4 Drawing Sheets

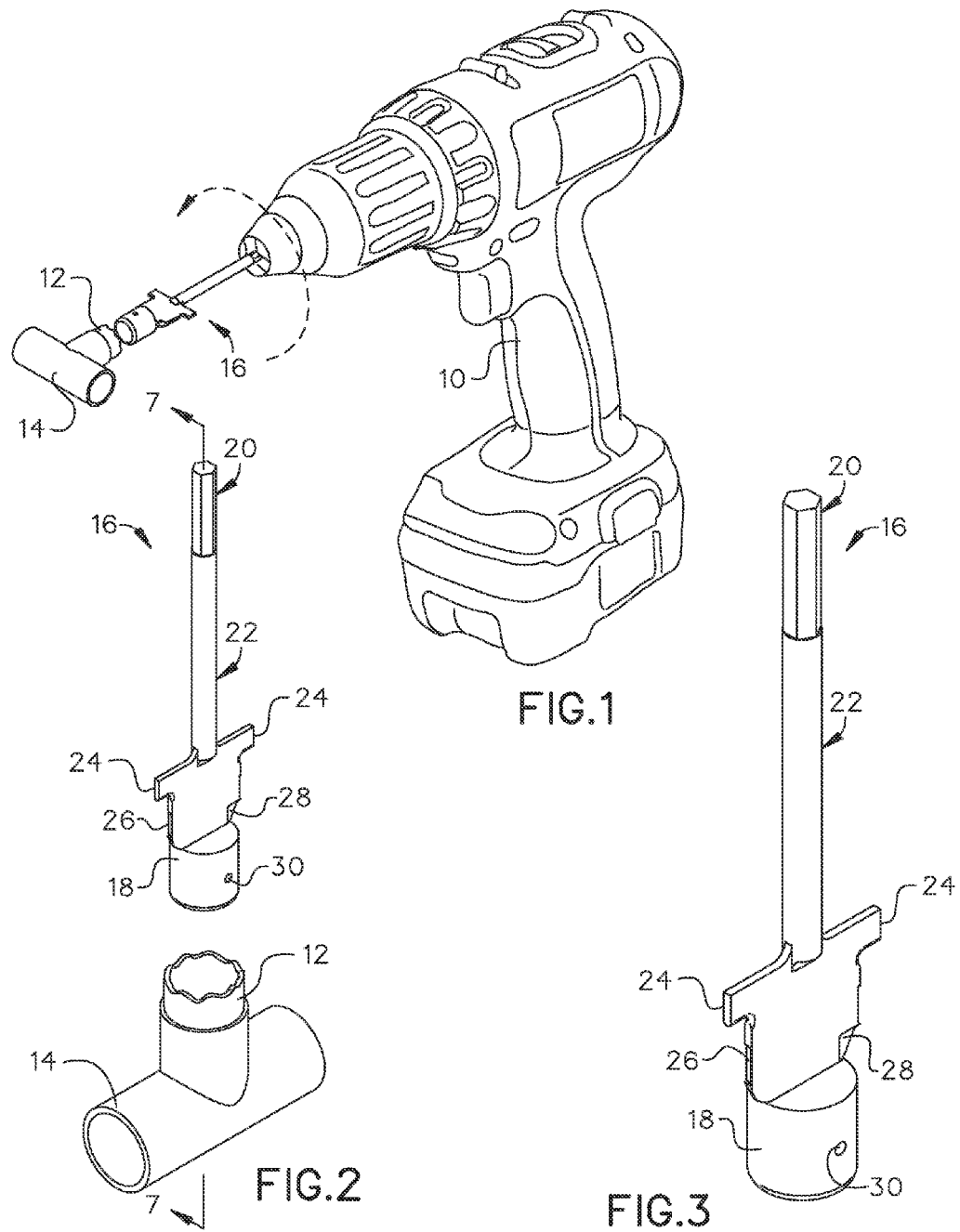

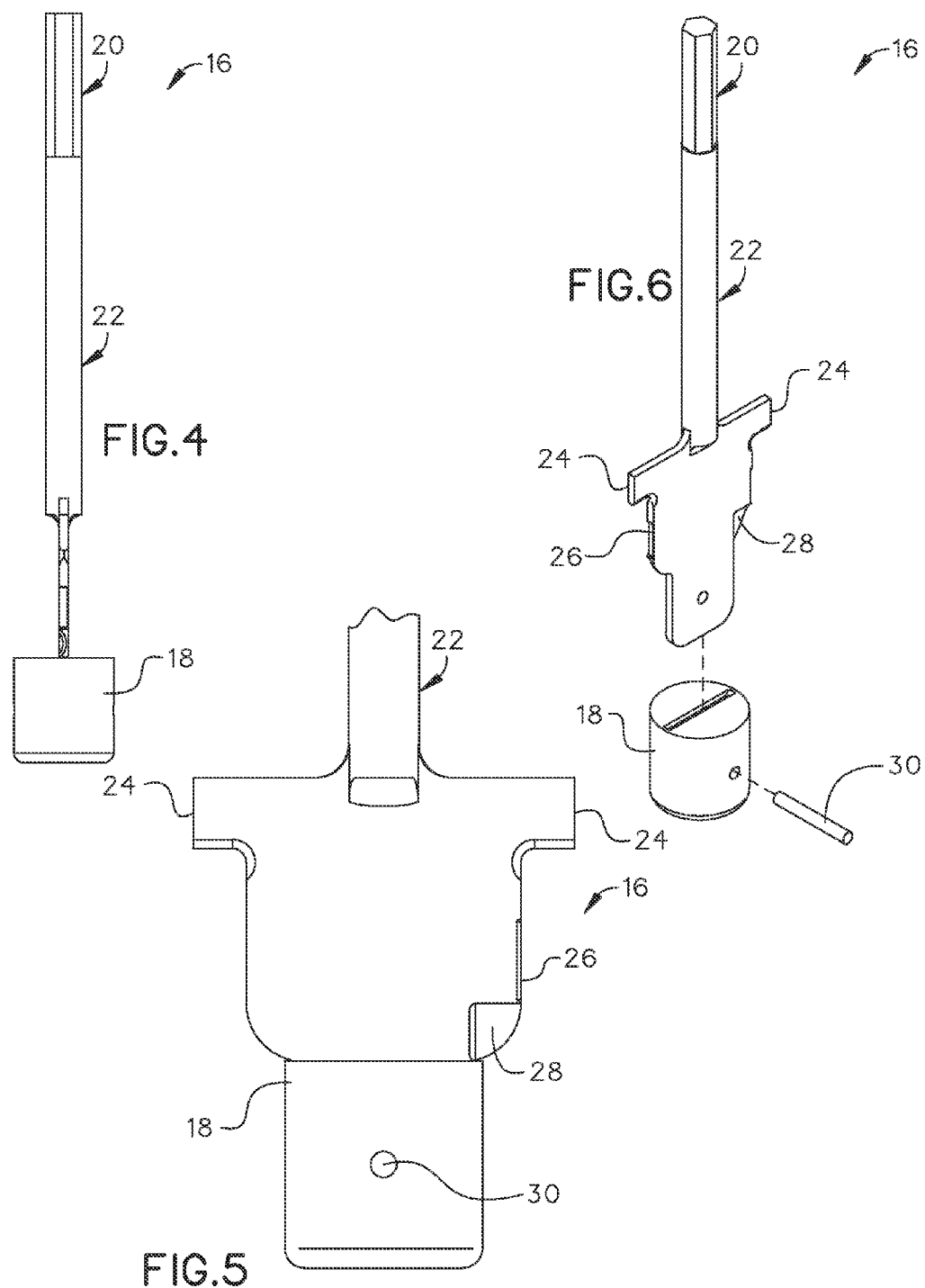

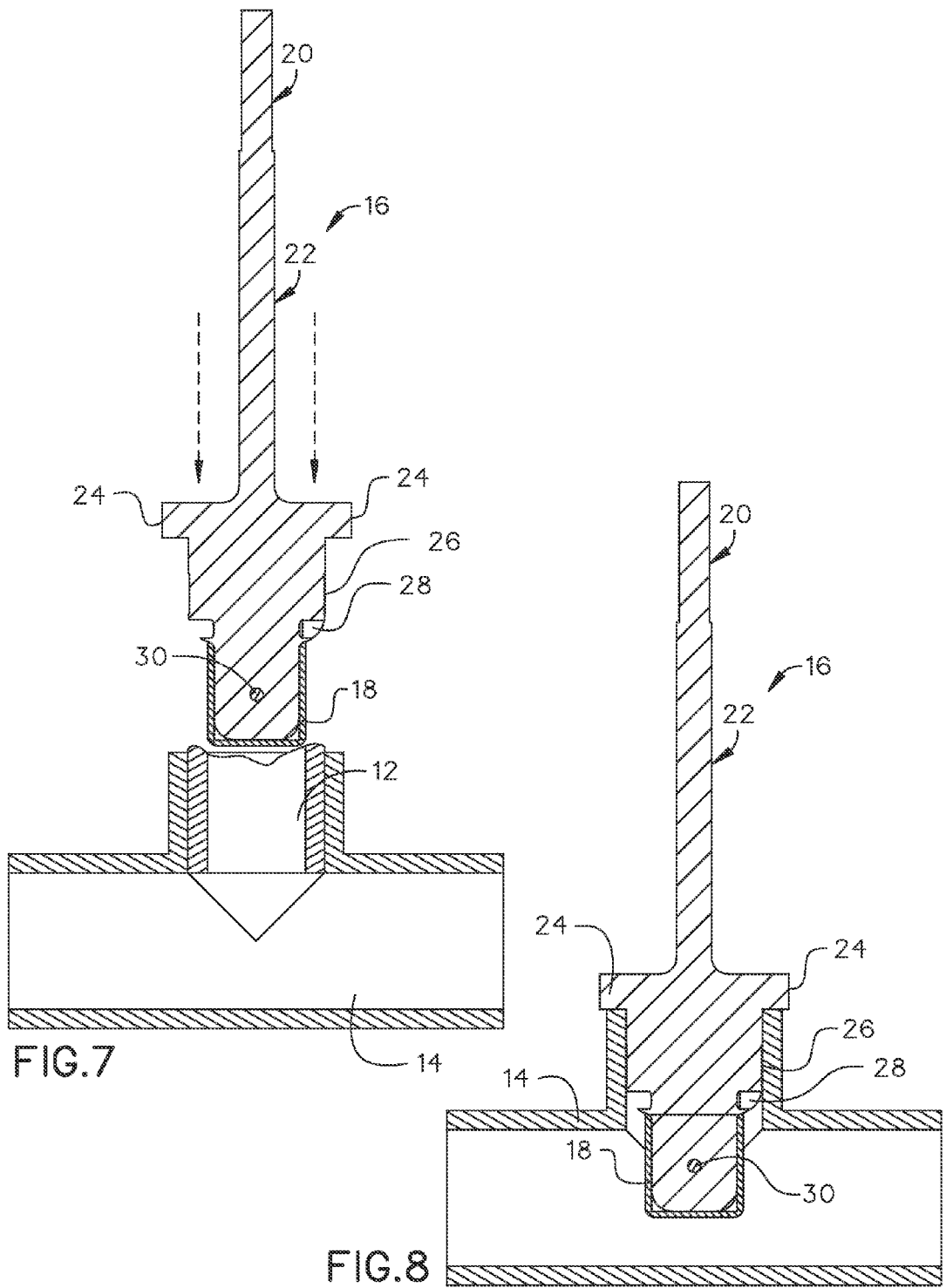

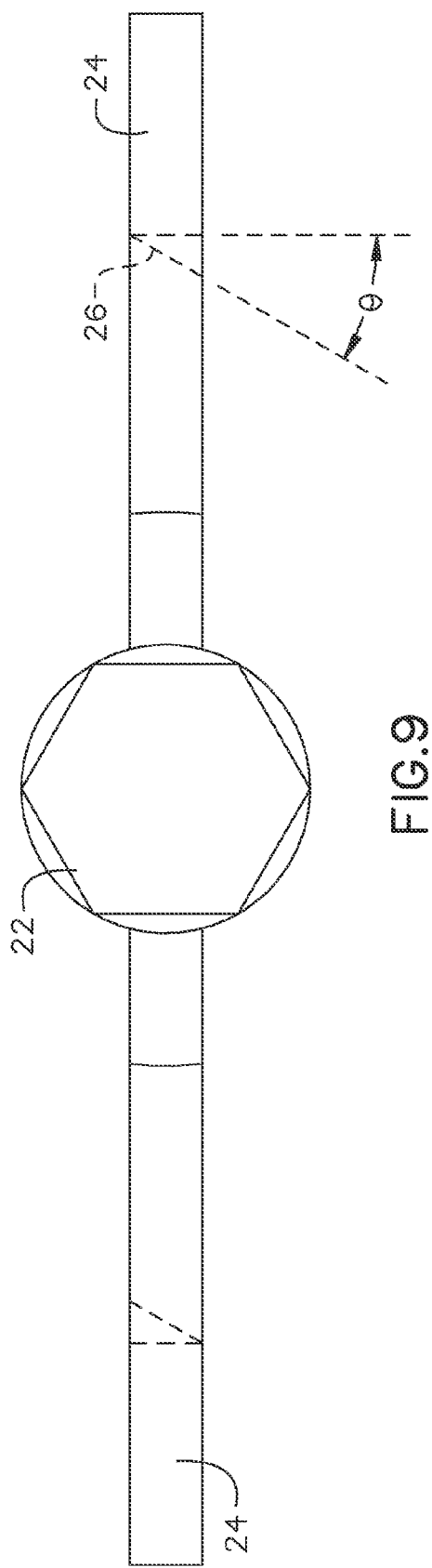

PIPE EXTRACTOR THAT REMOVES PIPE FROM CONNECTORS OR FITTINGS

FIELD OF THE INVENTION

This invention relates to methods and machines for penetrating material, without substantial reshaping flow of such material, by means of a solid tool that turns about an axis, and moves relative to a workpiece, along that axis during operation.

BACKGROUND OF THE INVENTION

Presently, to replace a broken piece of polyvinyl chloride (PVC) pipe a user must cut out the broken section of pipe with a hacksaw, and then replace the broken section with a new section of pipe that needs to be coupled to a repair coupling on each end of the existing pipe. Where the broken piece of PVC pipe is proximate an existing coupling, the entire coupling must be removed and renewed along with piping section on each side of the coupling. See e.g. How to Repair a Broken PVC Pipe Joint at: http://www.ehow.com/how_6028084_repair-broken-pvc-pipe-joint.html. Virtually all PVC pipe is designed the same way. There is a pipe which has an inner diameter, a pipe thickness and an outer diameter. A coupling has an inner diameter approximately equal to the outer diameter of the pipe, where the coupling has a coupling pipe thickness and a coupling outer diameter.

The current invention completely rethinks the prior art solution and teaches that PVC pipes can have broken sections bored proximate couplings allowing the user to replace only the damaged section of pipe and not the entire coupling area.

BRIEF SUMMARY OF THE INVENTION

A pipe extractor removes a broken pipe from a connector or a fitting. The pipe extractor comprises an upper shaft mechanically coupled to a lower shaft where the lower shaft is further mechanically coupled to cutting insert, the cutting insert comprises a stop, a shaving edge and a cutting edge. A user can affix the upper shaft to a drill and engage the drill to turn the cutting insert causing the cutting edge to remove the broken pipe from the connector or the fitting. The cutting insert is further affixed to a guide such that the guide can ensure that the cutting edge is properly aligned with the broken pipe.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

FIG. 1 is a perspective view of the pipe extractor shown in use.

FIG. 2 is a perspective view of the pipe extractor shown in use and the drill for illustrative clarity.

FIG. 3 is a perspective view of the pipe extractor.

FIG. 4 is a side view of the pipe extractor.

FIG. 5 is a front detail view of the pipe extractor.

FIG. 6 is an exploded view of the pipe extractor.

FIG. 7 is a section view of the pipe extractor along line 7-7 in FIG. 2. illustrated in pre-insertion configuration.

FIG. 8 is a section view of the pipe extractor illustrated in post insertion configuration.

FIG. 9 is a top view of an embodiment of the invention.

DETAILED DESCRIPTION OF THE INVENTION

Embodiments of the present invention overcome many of the obstacles associated with removing broken sections of PVC pipe proximate couplings, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows pipe extractor 16 in use. Drill 10 is mechanically coupled to pipe extractor 16 which can bore out broken pipe 12 proximate connector or fitting 14.

FIG. 2, FIG. 3, FIG. 4, FIG. 5 and FIG. 6 show various views of pipe extractor 16. Pipe extractor 16 comprises upper shaft 20 mechanically coupled to lower shaft 22. Geometrically, upper shaft 20 should be hexagonal in nature to fit inside drill 10, but upper shaft 20 can be any accommodating shape. Likewise, lower shaft 22 should be cylindrical in nature in order to efficiently handle torsion, but lower shaft 22 can be any shape.

Lower shaft 22 is further mechanically coupled to stop 24, stop 24 is designed to be wider than broken pipe 12, and various sizes can be used for various applications. Stop 24 rolls into a cutting insert where the cutting insert is flat and comprises a first end and a second end. The first end comprises shave edge 26. In the preferred embodiment shave edge 26 is a 15 degree shaving edge which can finely shave down portions of broken pipe 12. The second end comprises cutting edge 28. In the preferred embodiment, cutting edge 28 is a cupped shaped cutter to more quickly remove broken pipe 12. The cutting insert comprises curved shaped convex from the shaving edge to the first side of the cutting insert to the second side of the cutting insert. As shown in FIG. 9, this angle is measured from a plane parallel to the long edge of shaving edge 26.

In some embodiments shave edge 26 and cutting edge 28 are on the same end (FIG. 5). In some embodiments, shave edge 26 and cutting edge 28 are on different ends (FIG. 2, FIG. 3 and FIG. 6). Pipe extractor 16 works well in either configuration as long as cutting edge 28 is further from lower shaft 22 than shave edge 26. This is explained in more detail in FIG. 7 and FIG. 8.

From there extractor 16 proceeds downward into a flat section that can fit comfortably into a slot in guide 18, where pipe extractor 16 is affixed to guide 18 with flush rivet 30.

FIG. 7 and FIG. 8 show section views of pipe extractor 16 in use. To use pipe extractor 16, a user must first discern which pipe extractor 16 to use. The outer diameter of stop 24 should be greater than the coupling outer diameter of connector or fitting 14. The outer diameter of the section of extractor 16 comprising cutting edge 26 should be exactly the outer diameter of broken pipe 12. A guide outer diameter of guide 18 should be slightly less than the inner diameter of broken pipe 12. Pipe extractors 16 and guides 18 can be made in various sizes to accommodate the various sizes of PVC pipe presently or in the future in the marketplace.

To use pipe extractor 16. A user affixes upper shaft 20 to drill 10 (not shown) as noted above and then affixes guide 18 to pipe extractor 16 with flush rivet 30. A user then aligns guide 18 inside broken pipe 12, activates drill 10 and pushes downward, cutting edge 28 will start cutting off large sections of broken pipe 14 that are then finely shaven by shaving edge 26.

That which is claimed:

1. A pipe extractor configured to remove a broken pipe from a connector or a fitting, the pipe extractor comprising:
    an upper shaft mechanically coupled to a lower shaft;
        wherein the upper shaft is configured to fit inside of a drill;
    a cutting insert attached to the lower shaft;
        a shaving edge, embedded on a distal edge of a first side of the cutting insert
        a cutting edge, embedded on a second side of the cutting insert wherein the cutting insert comprises curved shape convex from the shaving edge to the first side of the cutting insert to the second side of the cutting insert; and configured to cut the broken pipe from a broken pipe inside surface to a broken pipe outside surface
        a stop, embedded onto the top of the cutting element and wider than the broken pipe in order to stop the shaving edge and the cutting edge from descending into the connector or the fitting.

2. The pipe extractor of claim 1, further comprising a guide, having a cylindrical shape, and attached to the cutting insert; wherein the guide is configured to fit within the broken pipe.

3. The pipe extractor of claim 1, wherein the shaving edge is a 15 degree shaving edge measured from a long side of the shaving edge.

\* \* \* \* \*